Figure 1:
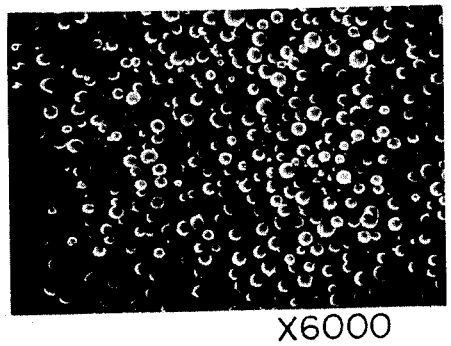

United States Patent [19]

Yui et al.

[11] 4,097,554

[45] Jun. 27, 1978

[54] PROCESS FOR PREPARING NOVEL POLYMER PARTICLES

[75] Inventors: Hiroshi Yui; Tetsuji Kakizaki; Hironari Sano; Masakazu Arai; Hiroshi Matsui, all of Yokkaichi, Japan

[73] Assignee: Mitsubishi Petrochemical Company Limited, Japan

[21] Appl. No.: 720,761

[22] Filed: Sep. 7, 1976

[30] Foreign Application Priority Data

Sep. 8, 1975 Japan .................................. 50-108739

[51] Int. Cl.² .......................................... C08F 255/02
[52] U.S. Cl. ............................................... 260/878 R
[58] Field of Search ................................... 260/878 R

[56] References Cited

U.S. PATENT DOCUMENTS

| | | | |
|---|---|---|---|
| 3,162,696 | 12/1964 | Zimmerman et al. | 260/878 R |
| 3,177,270 | 4/1965 | Jones et al. | 260/878 R |
| 3,565,780 | 2/1971 | Zimmerman | 260/878 R |
| 3,949,019 | 4/1976 | Zeitler et al. | 260/878 R |

*Primary Examiner*—Alan Holler
*Attorney, Agent, or Firm*—Robert E. Burns; Emmanuel J. Lobato; Bruce L. Adams

[57] ABSTRACT

Novel composite polymer particles are obtained, under specified conditions, by preparing an aqueous suspension comprising 100 parts by weight of propylene polymer particles, 5 - 200 parts of a vinyl or vinylidene monomer, and a specific polymerization initiator; heating the aqueous suspension to impregnate the propylene polymer particles with the monomer; and then raising the temperature of the aqueous suspension to complete polymerization of the monomer. The resultant composite polymer is improved in molding, mechanical, chemical and physical properties and is useful as molding or forming material as it is or as a blend with another polymeric material.

17 Claims, 4 Drawing Figures

X6000

X6000

$1\mu$

X6000

X6000

PROCESS FOR PREPARING NOVEL POLYMER PARTICLES

BACKGROUND OF THE INVENTION

(1) Field of the Invention

This invention relates to novel composite propylene polymer particles and a process for preparing the propylene polymer particles which are excellent in formability and have improved properties such as stiffness, dimensional stability and printability.

More particularly, this invention relates to a process for preparing a homogeneous composite resin comprising a propylene polymer and a vinyl polymer. The homogeneity of the composite resin is maintained even when the amount of the vinyl polymer is greater than that of the propylene polymer within a specific range.

Accordingly, this invention also relates to a process for preparing a modified vinyl polymer.

(2) Description of the Prior Art

So as to enhance the stiffness, dimensional stability, printability and the like of an olefin polymer such as polypropylene to be used as molding or forming material, the olefin polymer has hitherto been blended with a vinyl polymer such as polystyrene. An olefin polymer, however, generally has poor compatibility with polystyrene. Therefore, more than 10% by weight of polystyrene is not incorporated with an olefin polymer, and only 0.2 - 5% by weight of polystyrene has generally been blended therewith. Even when such a small amount of polystyrene is blended with an olefin polymer, the molding from the resulting blend is apt to have lower impact strength and impaired apppearance owing to poor compatibility of these two resins.

So as to eliminate such defects, there has been proposed a modified propylene polymer which is a graft-polymer with styrene produced by ionizing radiation. This process is considerably effective for homogeneously dispersing polystyrene into the body of propylene polymer particles. The process, however, has not been commercially employed since it utilizes a special means for a graft polymerization, namely radiation, and there is, thus, a problem from an economical point of view. Furthermore, this process permits only a limited amount of styrene to be introduced into the propylene polymer.

On the other hand, a process for graft polymerization in solution is known which utilizes a solvent such as xylene or chlorobenzene. The polymerization is carried out in a dilute solution in which a propylene polymer is dissolved in a large volume of solvent owing to its poor solubility. As a result, the process entails a difficulty in that the efficiency of the reaction of vinyl monomer is generally low since there is less chance for the vinyl monomer, polymerization initiator, and propylene polymer to come into contact with one another. Furthermore, the process entails an economic problem in that the after-treatments such as recovery of solvent are complicated. Graft polymerization in emulsion is also known. In this process, the polymerization reaction is liable to take place only on the surfaces of propylene polymer particles, and the resulting product tends to be inferior in homogeneity.

The process for polymerizing a vinyl monomer in an aqueous dispersion system in the presence of polypropylene particles is also known through Japanese Patent Publication No. 2346/1974, especially Example 6 therein. In this process, the impregnation with and polymerization of a vinyl monomer are simultaneously carried out. Consequently, the polymerization reaction tends to take place on the surfaces of polypropylene particles. Furthermore, the amount of vinyl monomer relative to polypropylene particles is restricted to a lower level according to the inherent nature of this process.

SUMMARY OF THE INVENTION

It is the principal object of the present invention to solve the various problems mentioned above by a single process, that is, by carrying out the supension polymerization of a vinyl or vinylidene monomer under specific conditions.

Other and further objects, features, and advantages of the present invention will appear more fully in the following description.

According to the present invention in one aspect thereof, briefly summarized, there is provided a process for preparing novel polymer particles which comprises the following steps:

(a) preparing an aqueous suspension comprising 100 parts by weight of propylene polymer particles, 5 - 200 parts by weight of vinyl or vinylidene monomer and 0.01 - 1 part by weight, to 100 parts by weight of the monomer, of a radical polymerization initiator having a decomposition temperature of 85° - 130° C for obtaining half-value period of 10 hours;

(b) heating the aqueous suspension under such conditions that substantially no decomposition of the initiator takes place thereby to impregnate the propylene polymer particles with the monomer to such an extent that less than about 20% by weight of the monomer remains free in the liquid phase; and (c) raising the temperature of the aqueous suspension to substantially complete polymerization of the monomer.

The process for preparing novel polymer particles according to the present invention involves the step of impregnating propylene polymer particles with a vinyl or vinylidene monomer (hereinafter referred to as a vinyl monomer) containing a polymerization initiator dissolved therein and the step of polymerizing the vinyl monomer. The present inventors have succeeded in the preparation of a homogeneous composite resin material by employing a specific quantitative ratio of the vinyl monomer to the propylene polymer and specific polymerization conditions in addition to the conventional technics of aqueous suspension polymerization of vinyl monomers.

According to the present invention, propylene polymer particles are impregnated with a vinyl monomer to such an extent that the amount of free monomer which has not been taken up into or onto the propylene polymer particles becomes less than about 20% by weight of the charged monomer, and then polymerization is effected. As a result, substantially all of the amount of charged vinyl monomer is polymerized within the polypropylene polymer particles, and a very small amount of the monomer may be polymerized on the surfaces of the polymer particles. In the polymerization product, the propylene polymer and the resulting vinyl polymer are alloyed within the original propylene polymer particles, and it is not substantially observed that they exist in separate particles. The process of the present invention can thus be regarded as being different in this sense from the conventional aqueous suspension polymerization of an oil-soluble vinyl monomer such as styrene.

The greater part of the vinyl monomer employed in the aqueous suspension is thus polymerized within propylene polymer particles. It appears that the polymerization results in some interaction between the resulting vinyl polymer and the propylene polymer, and there is exhibited very good compatibility between the two polymers. Furthermore, the resulting composite polymer particles are superior in homogeneity to the polymer particles disclosed in Japanese Patent Publication No. 2346/1974 mentioned above since according to the present invention propylene polymer particles are impregnated as far as the cores of the particles with a vinyl monomer, and then polymerization is carried out.

The composite resin obtained according to the present invention can be used by itself as a homogeneous molding or forming material since it has good compatibility between the two polymer contents. This composite resin is also characterized in that it has good compatibility with other thermoplastic resins. Therefore, this composite resin can be blended with other thermoplastic resins to prepare a molding material or can be utilized as a dispersant for two or more kinds of thermoplastic resins which have compatibility with the composite resin but do not with each other.

Homogeneity of the composite resin obtained from the present invention is also due to the process of the present invention which comprises the step of impregnating propylene polymer particles homogeneously as far as the cores of the particles with a vinyl monomer and the separate step of polymerization.

BRIEF DESCRIPTION OF THE ILLUSTRATIONS

Figure 2:
Figure 3:
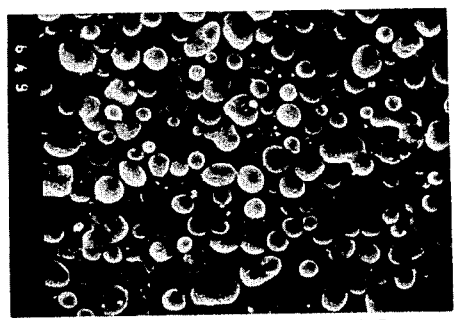
Figure 4:
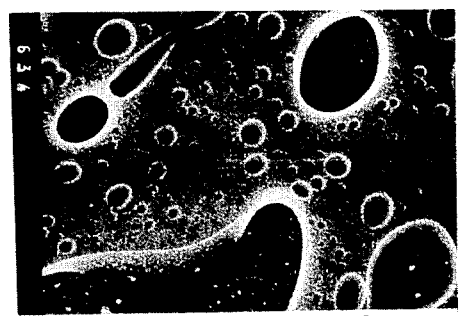

In the illustrations:

FIGS. 1 through 4 are photomicrographs (magnification × 6000), taken by means of a scanning electron microscope, respectively of resin materials. FIGS. 1 and 3 are photomicrographs of styrene-modified homopolypropylenes according to the present invention (Example 1). FIGS. 2 and 4 are those of the simple blends of homopolypropylene and polystyrene (Reference Example 2).

DETAILED DESCRIPTION (1) Impregnation of propylene polymer particles with vinyl monomer Propylene polymer particles The propylene polymers include propylene homopolymer and copolymers of a major amount of propylene with a minor amount of ethylene, another α-olefin, or a polar ethylenically unsaturated monomer. The copolymer generally contains not less than 60% by weight and preferably not less than about 75% by weight of propylene component. The propylene polymers may typically be exemplified by, for example, isotactic homopolypropylene, crystalline propylene-ethylene random copolymers, crystalline propylene-ethylene block copolymers, crystalline propylene-butene-1 random copolymers, maleic anhydride-modified polypropylenes, and the like.

These propylene polymers can be used alone or in mixtures. Furthermore, the propylene polymer can optionally be used concomitantly with other polymers, unless the properties of the propylene polymer are not greatly impaired by mixing it with the other polymers.

The polypropylene polymer particles are preferred to be in the form of pellets or powder having a narrow range of particle size distribution and an average particle size of about 0.3 - 5 mm so as to facilitate the impregnation of the polymer particles with the vinyl monomer and prevent the particles from agglomerating in the course of suspension polymerization. When the particle size is too large, the process may entail some trouble in that maintenance of dispersion of the particles during polymerization may be difficult to some extent, and the impregnation with vinyl monomers may take a longer time. The particle size of propylene polymer, however, is not always critical in the present invention, since the preparation can be carried out by impregnating the large particles for a longer time and grinding the resulting resin lumps to smaller particles following polymerization even when propylene polymer particles as large as 5 - 8 mm in size are employed.

According to the present invention, the shapes of starting propylene polymer particles are substantially retained in the resulting composite resin particles as they are. Therefore, the particle size of starting propylene polymer material can also be selected so that the resulting composite resin may have suitable particle size or shape and be employed as molding materials without further treatment.

Vinyl monomer

As defined above, the vinyl monomers include vinyl monomers, vinylidene monomers, and mixtures thereof.

The vinyl monomer is typically exemplified by styrene, a nucleus-substituted styrene such as a methylstyrene, a dimethylstyrene, an ethylstyrene, an isopropylstyrene and a chlorostyrene, an α-substituted styrene such as α-methylstyrene and α-ethylstyrene; an acrylate ester, especially, a $C_1 - C_7$ alkyl acrylate, a methacrylate ester, especially, a $C_1 - C_7$ alkyl methacrylate; a vinyl halide or vinylidene halide, especially, vinyl chloride or vinylidene chloride; acrylonitrile, methacrylonitrile; vinyl naphthalene, vinyl carbazole, acrylamide, methacrylamide, maleic anhydride, and the like. The vinyl monomer can be employed alone or in mixtures. When a hydrophilic or solid monomer is employed, the monomer may preferably be used in the form of a solution thereof in an oil-soluble monomer.

So as to obtain a modified propylene polymer of general use and having high stiffness, a suitable monomer to be employed in the present invention is styrene or a mixture of a major amount of styrene with a minor amount of another copolymerizable monomer, which is preferably selected from acrylonitrile, methylmethacrylate, vinyl chloride, maleic anhydride, and the like.

Amount of vinyl monomer to be employed

The amount of the vinyl monomer to be used in the present invention is generally about 5 to 200 parts by weight, preferably about 20 to 100 parts by weight, to 100 parts by weight of the propylene polymer. When the amount is more than about 200 parts by weight, homogeneity of the resulting composite resin is impaired because a large amount of the vinyl monomer remains without impregnation and there are separated propylene polymer particles and independent vinyl polymer particles in the course of polymerization. When the amount is less than about 5 parts by weight, the properties of the resulting composite resin are not sufficiently improved with respect to stiffness of the resulting resin, its compatibility with other thermoplastic resins, and the like.

When the quantitative ratio of vinyl monomer to propylene polymer is increased in the present invention, the dispersed particle size of vinyl polymer in the resulting composite resin has a tendency to become larger. Accordingly, this tendency can be utilized for preparing a desired type of the composite resin by changing the quantitative ratio of vinyl type monomer to propylene polymer. For example, an embodiment wherein styrene is used as the vinyl monomer is illustrated hereinbelow. When about 5 – 100 parts by weight of styrene is employed to 100 parts by weight of propylene polymer, the dispersed particles of polystyrene in the resulting composite resin are very small in size. Thus, the resulting composite resin is useful as a molding or forming material which is improved in stiffness and dimensional stability of propylene polymers, a material to be blended with other various thermoplastic resins, or a dispersant for two or more kinds of thermoplastic resins which do not have compatibility with each other. On the other hand, when about 100 – 200 parts by weight of styrene is used per 100 parts by weight of propylene polymer, the dispersed particles of polystyrene in the resulting composite resin are larger in size. Thus, the resulting composite resin may advantageously be used as a molding or forming material having high stiffness and excellent impact strength, or a material to be blended with styrene polymer resins.

Polymerization initiator

The polymerization initiator to be employed in the present invention is of oil-soluble type since polymerization is to be carried out in accordance with aqueous suspension polymerization techniques. The initiators produce radicals upon decomposition.

The present invention is further characterized in that the decomposition temperature for a half-value period of 10 hours of the polymerization initiator must be about 85° to 130° C, preferably about 90° to 110° C. When an initiator having a decomposition temperature lower than about 85° C is used, polymerization of vinyl monomer will take place in the course of impregnation and the homogeneous composite resin will not be obtained. An initiator having a decomposition temperature as defined above higher than about 130° C is not desirable since degradation of the propylene polymer molecules may take place at such a higher temperature.

Such polymerization initiators are typically exemplified by cyclohexanone peroxide (97° C), t-butyl peroxybenzoate (104° C), methylethyl ketone peroxide (109° C), dicumyl peroxide (117° C), di-t-butyl peroxide (124° C), 2,5-dimethyl-2,5-dibenzoylperoxyhexane (100° C), di-t-butyl-di-peroxyphthalate (105° C), and the like, wherein the temperature appearing in the parentheses is that which gives the initiator a 50% decomposition rate when 0.1 mole of the initiator is added to 1 liter of benzene and the mixture is allowed to stand for 10 hours at the temperature.

The amount of the polymerization initiator to be used is generally about 0.01 to 1 part by weight, preferably about 0.1 to 0.5 part by weight to 100 parts by weight of vinyl monomer. When the amount is less than about 0.01 part by weight, the vinyl monomer will not completely be polymerized. When the amount is more than about 1 part by weight, the degradation of propylene polymer molecules will be markedly exhibited to impair the properties inherent in the propylene polymer to a large extent. Furthermore, the remaining undecomposed polymerization initiator has an adverse effect on the resulting composite resin when it is molded.

Preparation of aqueous suspension

The preparation of the aqueous suspension according to the present invention is essentially the same as that of a conventional suspension polymerization of vinyl monomer except that propylene polymer particles are present in the system.

Into an aqueous medium, propylene polymer particles and a vinyl monomer or monomers in which a polymerization initiator has preferably been dissolved are dispersed by stirring in the presence of a suspending agent, for example, a water-soluble polymer such as polyvinyl alcohol, polyvinyl pyrrolidone and methyl cellulose, or a sparingly soluble inorganic particulate material such as calcium phosphate and magnesium oxide, and the like. The aqueous medium may contain various water-soluble materials dissolved therein.

The concentration of propylene polymer particles or vinyl monomer in the aqueous suspension is not especially restricted provided that stirring of the system can be effected with ease. For example, the concentration is generally in a range of about 5 to 100 parts by weight of propylene polymer particles and vinyl monomer to 100 parts by weight of water.

Impregnation with vinyl monomer

The aqueous suspension is heated under the condition that the polymerization initiator used therein does not substantially decompose thereby to impregnate propylene polymer particles with the vinyl monomer.

The impregnation is carried out by allowing the aqueous suspension to stand, preferably with stirring, until not less than about 80% and preferably not less than about 90% by weight of the vinyl monomer used in the suspension is taken up by impregnation into or onto the propylene polymer particles, that is, less than about 20% and preferably less than about 10% by weight of the vinyl monomer in droplets free from impregnation into or adhesion onto the propylene polymer particles remains in the suspension.

According to a series of experiments by the inventors, it has been found that independent vinyl polymer particles are separated and homogeneous dispersion of vinyl polymer into propylene polymer particles is not obtained when more than about 20% by weight of vinyl monomer free from impregnation remains in the suspension. Thus, the properties of the resulting composite resin inherent in the present invention cannot be obtained. The vinyl monomer which has remained free in the impregnation step in an amount less than 20% by weight is then taken up into propylene polymer particles or attaches to the surfaces of propylene polymer particles and is polymerized in the course of subsequent polymerization. Therefore, it is not observed in actuality that vinyl polymer particles exist independently of the propylene polymer particles.

As to the conditions of impregnation, a higher temperature is preferable from the viewpoint of accelerating the impregnation. On the other hand, a lower temperature is preferred from the viewpoint of preventing vinyl monomer from polymerizing before impregnation because of premature decomposition of the polymerization initiator. Accordingly, the desirable condition of the temperature is about 70° to 100° C and that of the time of stirring for impregnation, is about 2 to 6 hours.

The amount of free vinyl monomer which remains without impregnation can be determined in the following manner. A suitable amount of the aqueous suspension is taken out as a sample and is quickly filtered through a wire net of about 300 meshes to separate it into propylene polymer particles and a liquid phase, and then the vinyl monomer present in the liquid phase is measured. The ratio of the free vinyl monomer is calculated from the thus measured value and the amount of the charged vinyl monomer.

(2) Polymerization of vinyl monomer

Polymerization of the vinyl monomer is carried out by heating the thus prepared aqueous suspension at a higher temperature, preferably with stirring.

The heating temperature should be in a range for sufficiently decomposing the polymerization initiator used but preferably not higher than 150° C. When the temperature is higher than about 150° C, the properties inherent in the propylene polymer are markedly impaired since degradation of the propylene polymer molecules takes place. A temperature of about 100° to 130° C is generally suitable. The temperature is not necessarily required to be constant during the course of polymerization, but can be varied in two or more stages to obtain a composite resin of the desired properties.

The period of time for polymerization is generally in a range of about 5 to 20 hours.

As described above, the shape of the starting propylene polymer particles remains substantially unchanged even after the suspension polymerization of vinyl monomer has been completed. The resulting polymerization mixture is cooled after the polymerization and then treated in the same way as in the after-treatment of ordinary aqueous suspension polymerization to obtain a composite resin which can be used as a molding or forming material without further treatment.

(3) Resulting composite resin

The novel polymer particles thus obtained, that is, the composite resin may consist essentially of a propylene polymer having therein a homogeneously dispersed polymer which has been produced in situ from a vinyl monomer, a modified propylene polymer in which a vinyl monomer has been graft-polymerized onto the trunks of a propylene polymer, a modified propylene polymer in which a vinyl polymer has been graft-polymerized onto the surfaces of propylene polymer particles, or mixtures thereof. The resultant composite resin differs in quality and property from the original propylene polymer, and the vinyl polymer particles do not exist separately and independently of the propylene polymer particles.

The composite resin prepared according to the present invention is characterized in that a polymer produced from a vinyl monomer or monomers is homogeneously dispersed as almost spherical fine particles of about 0.1 - 2 $\mu$ in size in the propylene polymer. Such fine distribution of the particles has not been achieved by conventional simple blending techniques. By a conventional method, a vinyl polymer could be dispersed as particles of several tens of microns in size in the propylene polymer.

In comparison with unmodified propylene polymer, the composite resin prepared according to the present invention is much improved in mechanical strength such as flexural stiffness, tensile strength, and flexural strength and is also excellent in dimensional stability and printability, as shown in the examples given below. Generally speaking, the novel polymer according to the present invention is in the form of novel solid particles excelling in the following properties.

Molding or forming properties — fluidity in thermoplastic state, temperature range of stable molding, shrinkage of molded products, etc.

Mechanical properties — impact strength, tensile strength, creeping strength, surface strength, compression strength, elongation, abrasion resistance, etc..

Appearance — surface gloss, color tone, coloring property, etc..

Chemical properties — chemical resistance, weathering property, etc.

Physical properties — heat resistance, gas permeability, etc.

These properties are further described with respect to some typical resins as follows. For example, a composite resin obtained by using 5 to 200 parts by weight of styrene to 100 parts by weight of polypropylene has excellent fluidity in the same degree as the polypropylene resin and has a broad range of molding temperature. Therefore, the composite resin can be advantageously used as a material for injection molding as well as various moldings or formings such as film forming, blow molding, vacuum forming and rotational molding.

Polypropylene resin generally has a molding shrinkage factor as large as 1.4 to 1.8%, but the composite resin according to the present invention has a molding shrinkage factor as small as about 0.8%, which has been improved by the introduction of a styrene component, and it can be used as a material for engineering parts which require diemensional precision. As to the mechanical properties, stiffness is enhanced by 50 to 100% of that of the original polypropylene resin. Also, tensile strength and flexural strength are much improved. Furthermore, the surface hardness of polypropylene is 56.0 - 58.0 (Rockwell hardness), whereas that of the composite resin of the present invention is increased to 62.0 - 64.5 with improved abrasion resistance. Also, the surface gloss is much enhanced.

The heat resistance of the composite resin according to the present invention in which a crystalline ethylene-propylene copolymer having a melting point of 154° C has been used as the basic polymer is increased to 158 to 159° C in melting point. In particular, the composite resin in which crystalline ethylene-propylene copolymer has been employed as the basic polymer is markedly improved in adhesiveness relative to metals and inorganic materials such as glass compared with the unmodified copolymer resin.

(4) Application of the composite resin

The composite resin prepared according to the present invention is a modified propylene polymer having homogeneity and the excellent properties mentioned above and is advantageously utilized as molding material. It is, of course, possible to use the composite resin as molding or forming material by blending it with a pigment, a thermal stabilizer, a ultraviolet absorber, an antistatic agent, a flame-retardant, an inorganic filler, another thermoplastic resin, and the like.

One of the modes of use is to blend this composite resin with another thermoplastic resin. The novel polymer of the present invention consists essentially of a homogeneous composite of propylene polymer and vinyl polymer which has been formed by polymerizing vinyl monomer taken up in the propylene polymer by impregnation. One of the characteristics of this composite resin is a good compatibility with various thermoplastic resins. A homogeneous blend is prepared by incorporating a suitable amount of this composite resin with various thermoplastic resins and the resulting blend gives to the thermoplastic resins the abovementioned characteristics which are peculiar to this composite resin.

For example, the composite resin of the present invention is effective in the following polymer blends: Styrene-modified polypropylene improves impact strength and elongation of polystyrene when blended therewith and pigment dispersibility, stiffness and shrinkage of polypropylene when blended therewith. Styrene- and maleic anhydride-modified polypropylene improves printability of polypropylene when blended therewith; vinyl chloride-modified ethylene-propylene copolymer improves gas-barrier property of polypropylene when blended therewith; and methyl methacrylate-modified polypropylene improves stiffness and surface smoothness of polypropylene when blended therewith. Further, a blend of styrene- and acrylic acid-modified or styrene- and maleic anhydride-modified ethylene-propylene copolymer with polypropylene acquired greatly enhanced bonding strength to metals, glass and the like, compared with polypropylene alone.

The following examples are given by way of illustration and not by way of limitation of the present invention, and variations may be made by one skilled in the art without departing from the spirit and scope of the invention.

(5) EXAMPLES

Example 1

An autoclave 3 liter in capacity was charged with 1,400 g of pure water and 14 g of polyvinyl alcohol used as a suspending agent to obtain an aqueous medium. To the medium was added 700 g of homopolypropylene particles 2 to 3 mm in particle size (melt index (MI): 10) with stirring to suspend the particles therein. Separately, 0.50 g of t-butyl peroxybenzoate, a polymerization initiator, was dissolved in 300 g of styrene (43 parts by weight to 100 parts by weight of the polypropylene), which was added to the above-mentioned suspension system. The temperature in the autoclave was raised to and maintained at 90° C for 3 hours to impregnate the polypropylene resin particles with the styrene containing the polymerization initiator.

The resultant aqueous suspension was subjected to polymerization wherein it was heated to 105° C and maintained at this temperature for 2 hours. Then, the reaction system was heated to 120° C and maintained at this temperature for 5 hours to complete the polymerization reaction.

After cooling, the content of the autoclave was taken out and washed with water to obtain 1,000 g of styrene-modified polypropylene particles 3 to 4 mm in particle size.

Various types of styrene-modified homopolypropylene particles were obtained in the same way but with the various weight ratios of styrene to homopolypropylene particles and the period of time for impregnation as follows.

| No. | Homopolypropylene particles | Styrene | Weight ratio | Impregnation time |
|---|---|---|---|---|
| 1 | 943 g | 57 g | 100 : 6 | 2 hours |
| 2 | 600 g | 400 g | 100 : 67 | 3 hours |
| 3 | 490 g | 510 g | 100 :105 | 4 hours |
| 4 | 400 g | 600 g | 100 :150 | 4 hours |
| 5 | 340 g | 660 g | 100 :190 | 5 hours |

These modified homopolypropylene particles thus obtained were subjected to press-molding at 240° C to produce pressed sheets 2 mm thick. The flexural stiffness (ASTMD-747) and tensile strength (ASTMD-638) of each sheet were measured. The results obtained are shown in Table 1.

COMPARATIVE EXAMPLE 1

Styrene-modified homopolypropylene particles were obtained through polymerization under the same condition as in Example 1 except the change in the amount of the homopolypropylene particles to 310 g and that of styrene to 690 g (220 parts by weight of styrene to 100 parts by weight of the polypropylene) and in impregnation time to 5 hours.

The physical properties of the resulting product are shown in Table 1.

COMPARATIVE EXAMPLE 2

By means of a Brabender plastograph, 14 g of the homopolypropylene particles as employed in Example 1 and 26 g of polystyrene particles ("DIALEX HF-77", supplied by Mitsubishi Monsanto Co., Ltd., Japan) (190 parts by weight of the polystyrene to 100 parts of the polypropylene) were mixed at 230° C for 10 minutes, and the resultant blend was subjected to press-molding at 240° C to obtain a sheet 2 mm thick.

In the same way, the sheets of various blends were prepared with the different amounts of the homopolypropylene particles and the polystyrene particles as follows.

| No. | Homopolypropylene particles | Polystyrene particles | Weight ratio |
|---|---|---|---|
| 1 | 16 g | 24 g | 100 : 150 |
| 2 | 19.6 g | 20.4 g | 100 : 105 |
| 3 | 24 g | 16 g | 100 : 67 |
| 4 | 28 g | 12 g | 100 : 43 |
| 5 | 37.7 g | 2.3 g | 100 : 6 |

The physical properties of these sheets are shown in Table 1.

The physical properties with respect to flexural stiffness (ASTM D-747) and tensile strength (ASTM D-638) were measured on a pressed sheet 2 mm thick of each blend.

Table 1

| Amount of styrene to 100 parts by weight of homopolypropylene (parts by weight) | | (homopolypropylene) 0 | 6 | 43 | 67 | 105 | 150 | 190 | (Comparative Example 1) 220 |
|---|---|---|---|---|---|---|---|---|---|
| Flexural stiffness kg/cm$^2$ (ASTM D-747) | Present invention | 10,500 | 11,500 | 14,200 | 15,300 | 17,100 | 19,000 | 20,400 | 20,000 |
| | Comparative Example 2 | | 9,000 | 10,500 | 11,600 | 13,000 | 15,600 | 16,000 | |

Table 1-continued

| Tensile break strength kg/cm² (ASTM D-638) | Present invention | 330 | 365 | 383 | 398 | 415 | 420 | 290 |
|---|---|---|---|---|---|---|---|---|
| | Comparative Example 2 | 305 | 280 | 225 | 201 | 185 | 180 | 198 |

As is apparent from the results shown in Table 1, the modified polypropylene polymer particles of the present invention are greatly improved in stiffness and tensile strength in comparison with the simple blends of polypropylene and polystyrene. Furthermore, it can also be seen that the modified polystyrene particles of the present invention are improved in stiffness and tensile strength when compared with the corresponding unmodified polypropylene.

When the weight ratio of styrene to polypropylene is as high as 200 : 100 or more as in Comparative Example 1, the homogeneity of the dispersion of the resultant polystyrene into polypropylene is impaired, and the flexural stiffness and tensile strength of the products deteriorate. FIGS. 1 through 4 are the photomicrographs taken by means of a scanning electron microscope of the internal structures of the styrene-modified homopolypropylene particles according to the present invention and the homopolypropylene polystyrene simple blend according to the Comparative Example 2.

These photomicrographs were taken on samples prepared by the ion etching method, and each of them shows the phase dispersion of the polystyrene in each pressed sheet which had been mixed by means of a Brabender plastograph (at 230° C for 10 minutes).

As clearly shown in these photomicrographs, the polystyrene is homogeneously dispersed in the form of fine particles in the case of the styrene-modified homopolypropylene (FIGS. 1 and 3), and it is to be noted that the dispersion condition thereof markedly differs from that of the polystyrene in a simple blend (in which the particles aggregate to form large domains, and the dispersion unit thereof is very large and irregular) (FIGS. 2 and 4).

The size of the dispersed polystyrene particles in the modified polypropylene is not larger than 1 μ when the proportion of styrene content is small (FIG. 1), while it is around 1 μ when the proportion thereof is increased (FIG. 3).

EXAMPLE 2

An autoclave 3 liter in capacity was charged with 1,400 g of pure water and 10 g of calcium phosphate plus 2 g of sodium dodecylbenzene sulfonate used as a suspending agent to prepare an aqueous medium. Then 700 g of homopolypropylene particles (MI : 10) 2 to 3 mm in particle size were suspended in the medium with stirring.

Separately, 1.5 g of a compound shown in Table 2 was dissolved as a polymerization initiator in 300 g of styrene, and the resulting solution was added to the suspension obtained as stated above. The autoclave charged with the resultant mixture was heated until the temperature therein was raised to 80° C, and this temperature was maintained for 4 hours to impregnate the polypropylene particles with the styrene containing the polymerization initiator.

The aqueous suspension was heated to 105° C and maintained at this temperature for 4 hours to carry out polymerization, which was followed by further heating to 120° C and maintaining this temperature for 5 hours to complete the polymerization.

After cooling, the contents of the autoclave were taken out and washed with water to obtain 1,000 g of styrene-modified polypropylene particles 3 to 4 mm in particle size. The results are shown in Table 2.

Table 2

| | Polymerization initiator | Decomposition temperature for giving a half-value period of 10 hours (° C) | Results |
|---|---|---|---|
| Comparative Example 3 | t-butylperoxy-isobutylate | 78 | Styrene polymerized during impregnation step, and the resultant polystyrene did not disperse homogeneously |
| Present invention | 1,1-bis(t-butylperoxy) cyclohexane | 91 | Polystyrene dispersed homogeneously |
| | t-butylperoxy benzoate | 104 | " |
| | di-t-butylperoxide | 124 | " |
| Comparative Example 4 | 2,5-dimethyl-2,5-di-t-butyl-peroxyhexane | 135 | There remained the polymerization initiator and unpolymerized styrene |

As can be seen in Table 2, these polymerization initiators which decompose at a temperature in the range of 85° to 130° C to give a half-value period of 10 hours provide polymer particles in which polystyrene particles are homogeneously dispersed.

When a polymerization initiator having a decomposition temperature for the half-value period of lower than 85° C was employed as in Comparative Example 3, the dispersion of the polystyrene into the resulting polymer particles became inhomogeneous in the direction of the diameters of the resulting particles, that is, in the direction of from the surfaces to the cores of the particles or vice versa, whereby the physical properties of the polymer deteriorated. In addition, the particles of the polymer stuck to one another, which sometimes made it difficult to wash with water and dry the polymer particles following the polymerization.

On the other hand, when a polymerization initiator of which the decomposition temperature for the half-value period is higher than 130° C was employed as in Comparative Example 4, unpolymerized styrene and the polymerization initiator remained in the polymer particles. Such residual unpolymerized styrene produced bubbles in the resin during the melt processing thereof, while the residual polymerization initiator caused the main chain of the polypropylene to be cut, whereby a molding having desirable physical properties was not obtained.

EXAMPLE 3

Test pieces were prepared by using the styrene-modified homopolypropylene particles obtained in Example 1, an unmodified homopolypropylene, and a blend prepared in Comparative Example 2, by means of a screw-in-line type injection molding machine at 240° C. The mold shrinkage, modulus in flexure and flexural strength of each test piece were then measured. The results are shown in Table 3.

dimensional stability and improved also in modulus in flexure and flexural strength and in melting point, compared with the unmodified ethylene-propylene random copolymer.

Table 3

|  |  | Weight ratio | | Mold shrinkage | Modulus in flexure | Flexural strength |
| --- | --- | --- | --- | --- | --- | --- |
|  |  | polypropylene parts by weight | styrene parts by weight | % (longitudinal/lateral) | JIS K-7203 kg/cm² | JIS K-7203 kg/cm² |
| Present invention | styrene-modified homopolypropylene | 100 | 150 | 0.8/0.8 | 22,500 | 590 |
|  | " | 100 | 105 | 0.9/1.0 | 20,500 | 540 |
|  | " | 100 | 43 | 1.1/1.2 | 17,500 | 480 |
| Comparative Example 2 | homopolypropylene/polystyrene simple blend | 100 | 43 | 1.1/1.2 | 14,000 | 280 |
| Comparative Example | unmodified homopolypropylene | 100 | 0 | 1.4/1.7 | 12,000 | 360 |

As is apparent from the results in Table 3, it is seen that the styrene-modified homopolypropylenes of the present invention are greatly improved in dimensional stability, modulus in flexure, and flexural strength in comparison with the unmodified homopolypropylene. Furthermore, when compared with the blend, the styrene-modified homopolypropylene was found to be superior in modulus in flexure and in flexural strength.

EXAMPLE 4

Polymerization reaction was carried out in the same way as in Example 1 by using either 520 g of crystalline ethylene-propylene random copolymer particles (containing 3% by weight of ethylene, melt index: 7) and 480 g of styrene (92 parts by weight of styrene to 100 parts of the polypropylene) or by using 700 g of crystalline ethylene-propylene random copolymer and 300 g of styrene (43 parts by weight of styrene to 100 parts of the polypropylene) to obtain crystalline ethylene-propylene random copolymer particles.

By using the modified polymer particles thus obtained and, as a reference, an unmodified crystalline ethylene-propylene random copolymer, test pieces were prepared by means of a screw-in-line type injection molding machine at 240° C. The modulus in flexure, flexural strength, mold shrinkage and melting point of each test piece were measured. The results are shown in Table 4. The melting points were determined by the peak temperatures at which the meltings of the pieces were completed by means of DSC (differential scanning calorimeter) (heating rate: 10° C/min. cooling rate: 10° C/min).

EXAMPLE 5

A film 60 μ thick was prepared by molding the styrene-modified crystalline ethylene-propylene random copolymer particles (ethylene-propylene random copolymer: 100 parts by weight, styrene: 92 parts) which had been obtained in accordance with the procedure in Example 4, by means of a T-die film forming machine with an orifice of 65 mm-diameter (molding temperature: 230° C). Onto one surface of the film was applied an ink known under the trade name "SPP" and supplied by Dai-Nippon Ink & Chemicals Inc., Japan, by means of a Mayer bar coater. After sufficiently drying, the coated surface was cut into 100 cross-cuts. The resultant film was then subjected to a pressure-sensitive cellophane tape peeling test where the tape was adhered onto the 100 cross-cuts of the ink and was peeled, and the number of the ink cross cuts peeled off with the tape was counted. The following data was obtained.

| Sample | No. of the cross-cuts of the ink peeled off |
| --- | --- |
| styrene-modified ethylene-propylene random copolymer | 5 |
| unmodified ethylene-propylene random copolymer | 100 |

It is apparent from the results in the above table that the copolymer obtained according to the present invention was remarkably improved in adhesion with respect to a printing ink without subjecting the film to a special treatment, compared with the unmodified ethylene-propylene random copolymer.

Table 4

|  |  | Weight ratio | | Mold shrinkage | Modulus in flexure | Flexural strength | Melting point |
| --- | --- | --- | --- | --- | --- | --- | --- |
|  |  | Polypropylene parts by weight | styrene parts by weight | % (longitudinal/lateral) | JIS K-7203 kg/cm² | JIS K-7203 kg/cm² | C° |
| Present invention | styrene-modified ethylene-propylene random copolymer | 100 | 92 | 0.9/1.0 | 18,700 | 485 | 159 |
|  |  | 100 | 43 | 1.1/1.2 | 16,000 | 430 | 158 |
| Comparative example | unmodified ethylene-propylene random copolymer | 100 | 0 | 1.5/1.6 | 9,800 | 320 | 154 |

From the results in Table 4, it was observed that the styrene-modified ethylene-propylene random copolymers of the present invention were greatly improved in

EXAMPLE 6

Polymerization reaction was carried out in the same way as in Example 1 by using either 520 g of crystalline ethylene-propylene block copolymer (ethylene content: 12% by weight, melt index: 1.2), 480 g of styrene (92 parts by weight of styrene to 100 parts of the polypropylene) and 0.25 g of di-t-dibutyldiperoxyphthalate used as a polymerization initiator, or 700 g of crystalline ethylene-propylene block copolymer, 300 g of styrene (43 parts by weight of styrene to 100 parts by weight of the polypropylene) and 0.25 g of di-t-dibutyldiperoxyphthalate used as a polymerization initiator to obtain styrene-modified ethylene-propylene block copolymer particles.

By using the modified polymer particles thus obtained and an unmodified crystalline ethylene-propylene block copolymer as a comparative example, a test piece of each material was prepared by means of a screw-in-line type injection molding machine at 240° C. The modulus in flexure, flexural strength, mold shrinkage and surface hardness of each test piece were measured. The results are shown in Table 5.

injection molding, film forming, vacuum forming and rotational molding. Also, they are very suitable as housing material, interior decoration material of automobiles, material for precision electric parts and material for industrial parts which are required to have high stiffness.

EXAMPLE 7

The procedure of Example 1 was repeated by using 700 g of homopolypropylene particles (melt index: 10) and 300 g of methyl methacrylate (43 parts by weight to 100 parts of the polypropylene) as a vinyl monomer to obtain methyl methacrylate-modified homopolypropylene particles.

By using the modified homopolypropylene thus obtained and an unmodified homopolypropylene as a comparative example, a test piece of each polymer was prepared by means of a screw-in-line type injection molding machine at 240° C. The mold shrinkage, modulus in flexure and flexural strength of each test piece were measured. The results are shown in Table 6.

Table 6

|  |  | Weight ratio | | Mold shrinkage % (longitudinal/ lateral) | Modulus in flexure JIS K-7203 kg/cm² | Flexural strength JIS K-7203 kg/cm² |
| --- | --- | --- | --- | --- | --- | --- |
|  |  | polypropylene parts by weight | methyl methacrylate parts by weight |  |  |  |
| Present invention | methyl methacrylate-modified homopolypropylene | 100 | 43 | 1.2/1.2 | 16,000 | 550 |
| Comparative example | unmodified homopolypropylene | 100 | 0 | 1.4/1.4 | 12,000 | 360 |

It was observed from the results in Table 6 that the methyl methacrylate-modified homopolypropylene of Table 5

|  |  | Weight ratio | | Mold shrinkage % (longitudinal/ lateral) | Modulus in flexure JIS K-7203 kg/cm² | Flexural strength JIS K-7203 kg/cm² | Hardness ASTM D-785 R scale |
| --- | --- | --- | --- | --- | --- | --- | --- |
|  |  | Polypropylene parts by weight | styrene parts by weight |  |  |  |  |
| Present invention | styrene-modified ethylene-propylene block copolymer | 100 | 92 | 1.1/1.0 | 19,800 | 540 | 63 |
|  | styrene-modified ethylene-propylene block copolymer | 100 | 43 | 1.2/1.2 | 17,000 | 460 | 61 |
| Comparative example | unmodified ethylene-propylene block copolymer | 100 | 0 | 1.6/1.8 | 9,900 | 350 | 58 |

It was observed from the results in the above table that the styrene-modified ethylene-propylene block copolymers of the present invention were greatly improved in dimensional stability, modulus in flexure, flexural strength and surface hardness, compared with the unmodified ethylene-propylene block copolymer.

Consequently, it was made clear that the modified copolymers of the present invention were excellent in mechanical properties such as stiffness, tensile strength, flexural strength, compression strength and creeping resistance, and excellent in other properties such as surface hardness, abrasion resistance, dimensional stability and surface gloss, and had good heat resistance while retaining a molding processability equivalent to that of the original polypropylene resin (having a good fluidity and a wide range of processing temperature). Because of such properties as mentioned above, the modified copolymers of the present invention are applicable to a wide range of the molding processes such as the present invention was improved in mold shrinkage, modulus in flexure, and flexural strength, compared with the unmodified homopolypropylene.

Example 8

Polymerization reaction was carried out in the same way as in Example 6 by employing 520 g of ethylene-propylene block copolymer (PEP), 430 g of styrene and 50 g of acrylonitrile to obtain 1001 g of styrene-acrylonitrile-modified ethylene-propylene block copolymer particles.

A test piece was prepared by means of a screw-in-line type injection molding machine at 240° C from the composite polymer thus obtained. Modulus in flexure and flexural strength thereof were measured. The results are shown in Table 7.

Table 7

| Items | | Modulus in flexure | Flexural strength |
|---|---|---|---|
| | Method for measurement | JIS K-7203 | JIS K-7203 |
| Sample | Unit | kg/cm² | kg/cm² |
| Present invention | styrene-acrylonitrile-modified (PEP/styrene/acrylo-nitrile = 52/43/5) | 22,000 | 560 |
| Comparative example | unmodified ethylene-polypropylene block copolymer | 9,900 | 350 |

As clearly shown in Table 7, it was confirmed that the modulus in flexure and flexural strength of the ethylene-propylene block copolymer were also greatly improved by the introduction of styrene and acrylonitrile.

EXAMPLE 9

The polymerization reaction in Example 1 was repeated with the impregnation temperature varied to obtain the results shown in Table 8.

It is apparent from the results that the impregnation temperature suitable for obtaining the end product, that is, the modified polypropylene resin ranges from 70° C to 100° C under the condition of Example 1.

Table 8

| No. | Impregnation temp. (° C) | Results |
|---|---|---|
| 1 | 65 | Polystyrene membrane produced on the surfaces of the polymer particles |
| 2 | 85 | Polystyrene well dispersed in the polymer particles |
| 3 | 95 | " |
| 4 | 105 | Polystyrene membrane produced on the surfaces of the polymer particles |

When the impregnation temperature was lower than 70° C, the polypropylene particles had not been sufficiently impregnated with styrene before the temperature of the system was raised to a polymerization temperature. Therefore, the residual styrene which has not been taken up into the particles underwent a rapid polymerization reaction to produce polystyrene which was deposited in the form of films onto the surfaces of the polypropylene particles and there produced polymer particles in which polystyrene was inhomogeneously dispersed. On the other hand, when the impregnation temperature was higher than 100° C, the polymerization reaction proceeded at a considerably rapid rate in the course of the impregnation step; therefore, the resulting polystyrene was deposited onto the surfaces of the polypropylene particles as in the case where the impregnation temperature was lower than 70° C.

When the impregnation was carried out at a temperature outside the standard range (70° to 100° C) the dispersion of polystyrene was inhomogeneous between the central parts of the polymer particles and the neighborhood of the surfaces thereof. The composite polymer having such inhomogeneous dispersion is not desirable since it causes the physical properties of molded product to deteriorate.

We claim:

1. A process for preparing novel propylene polymer particles which comprises:
   (a) preparing an aqueous suspension comprising 100 parts by weight of propylene polymer particles, about 5 to 200 parts by weight of a vinyl or vinylidene monomer, and about 0.01 to 1 part by weight, to 100 parts by weight of the monomer, of a radical polymerization initiator having a decomposition temperature of about 85° to 130° C for obtaining a half-value period of 10 hours;
   (b) heating the resulting aqueous suspension under such conditions that substantially no decomposition of the initiator takes place thereby to impregnate the propylene polymer particles with the monomer to such an extent that less than about 20% by weight of the monomer remains free in the liquid phase; and
   (c) raising the temperature of the aqueous suspension to substantially complete the polymerization of the monomer.

2. The process as set forth in claim 1, in which the greater part of the monomer employed in the aqueous suspension is polymerized within the propylene polymer particles, and the propylene polymer and the resulting vinyl or vinylidene polymer are present in composite polymer particles.

3. The process as set forth in claim 1, in which the propylene polymer is at least one polymer selected from the group consisting of propylene homopolymer and copolymers of a major quantity of propylene and a minor quantity of ethylene, another α-olefin and/or a polar ethylenically unsaturated monomer.

4. The process as set forth in claim 3, in which the propylene polymer is at least one polymer selected from the group consisting of isotactic homopolypropylene, crystalline propylene-ethylene random copolymer, crystalline propylene-ethylene block copolymer, crystalline propylene-butene-1 random copolymer, and maleic anhydride-modified polypropylene.

5. The process as set forth in claim 1, in which the propylene polymer particles are in the form of pellets or powder having a mean particle size of 0.3 to 5 mm.

6. The process as set forth in claim 1, in which the vinyl or vinylidene monomer is at least one monomer selected from the group consisting of styrene, methyl styrenes, dimethyl styrenes, ethyl styrenes, isopropyl styrenes, chlorostyrenes, α-methylstyrene, α-ethylstyrene, $C_1$-$C_7$ alkyl acrylates, $C_1$-$C_7$ alkyl methacrylates, vinyl halides, vinylidene halides, acrylonitrile, methacrylonitrile, vinyl naphthalene, vinyl carbazole, acrylamide, methacrylamide, and maleic anhydride.

7. The process as set forth in claim 6, in which the vinyl or vinylidene monomer is styrene or a mixture of a major amount of styrene with a minor amount of another copolymerizable monomer.

8. The process as set forth in claim 7, in which the vinyl or vinylidene monomer is a mixture of styrene and at least one monomer selected from acrylonitrile, methyl methacrylate, vinyl chloride, and maleic anhydride.

9. The process as set forth in claim 1, in which about 20 to 100 parts by weight of the vinyl or vinylidene monomer to 100 parts by weight of the propylene polymer is employed in the aqueous suspension.

10. The process as set forth in claim 1, in which a radical polymerization initiator having a decomposition temperature of about 90° to 110° C for obtaining half-value period of 10 hours is employed.

11. The process as set forth in claim 1, in which about 0.1 to 0.5 part by weight of the radical polymerization initiator to 100 parts by weight of the monomer is employed.

12. The process as set forth in claim 1, in which the radical polymerization initiator is selected from the group consisting of cyclohexanone peroxide, t-butyl-peroxybenzoate, methyl ethyl ketone peroxide, dicumyl peroxide, di-t-butyl peroxide, 2,5-dimethyl-2,5-dibenzoyl-peroxyhexane, and di-t-butyl-di-peroxyphthalate.

13. The process as set forth in claim 1, in which the concentration of the aqueous suspension is substantially in the range of about 5 to 100 parts by weight of the propylene polymer particles and vinyl or vinylidene monomer to 100 parts by weight of water.

14. The process as set forth in claim 1, in which the impregnation of the propylene polymer particles with the vinyl or vinylidene monomer is carried out to such an extent that less than about 10% by weight of the monomer remains free in the liquid phase.

15. The process as set forth in claim 1, in which the temperature at which the impregnation is carried out is about 70° to 100° C.

16. The process as set forth in claim 1, in which the polymerization of the vinyl or vinylidene monomer is carried out at a temperature up to about 150° C.

17. The process as set forth in claim 2, in which the resulting vinyl or vinylidene polymer is homogeneously dispersed as substantially spherical fine particles of about 0.1 to 2 $\mu$ in size in the propylene polymer.

* * * * *